United States Patent [19]

Dietzel

[11] Patent Number: 4,691,550

[45] Date of Patent: Sep. 8, 1987

[54] METHOD AND APPARATUS FOR MAKING A PRESSURE HOSE SOCKET

[76] Inventor: Klaus Dietzel, Herdekamp 8, DE-4232 Xanten, Fed. Rep. of Germany

[21] Appl. No.: 857,761

[22] PCT Filed: Sep. 3, 1985

[86] PCT No.: PCT/EP85/00441

§ 371 Date: Mar. 28, 1986

§ 102(e) Date: Mar. 28, 1986

[87] PCT Pub. No.: WO86/01441

PCT Pub. Date: Mar. 13, 1986

[30] Foreign Application Priority Data

Sep. 4, 1984 [DE] Fed. Rep. of Germany ....... 3432443

[51] Int. Cl.⁴ .................... B21D 15/06; B21D 41/00; B21K 1/16
[52] U.S. Cl. .......................................... 72/68; 72/70; 72/367; 72/324; 72/80; 29/508; 29/516
[58] Field of Search ................. 408/83; 72/68, 70, 71, 72/75, 80, 370, 367, 108, 324; 29/508, 516, 157 R

[56] References Cited

U.S. PATENT DOCUMENTS

| | | | |
|---|---|---|---|
| 1,666,581 | 4/1928 | Rainaud | 72/80 |
| 2,300,517 | 11/1942 | Milton | 29/508 |
| 2,771,117 | 11/1956 | Le Febvre et al. | 72/80 |
| 3,371,408 | 3/1968 | Charbonnet et al. | 29/508 |
| 3,479,713 | 11/1969 | Weatherhead et al. | 29/157 R |
| 4,548,430 | 10/1985 | Haubert et al. | 29/508 |

FOREIGN PATENT DOCUMENTS

| | | | |
|---|---|---|---|
| 2532624 | 2/1977 | Fed. Rep. of Germany . | |
| 2332476 | 6/1977 | France . | |
| 16737 | 1/1983 | Japan | 72/108 |
| 2092919 | 8/1982 | United Kingdom . | |

Primary Examiner—Lowell A. Larson
Attorney, Agent, or Firm—Tarolli, Sundheim & Covell

[57] ABSTRACT

A method and apparatus for making a pressure hose socket with at least one inwardly projecting crown having at least one tooth therein which points toward an end of the socket. The socket is pressed on its outer surface to form the inwardly projecting crown. The crown is then engaged by a coaxially extending stamp to form the tooth on the crown.

13 Claims, 25 Drawing Figures

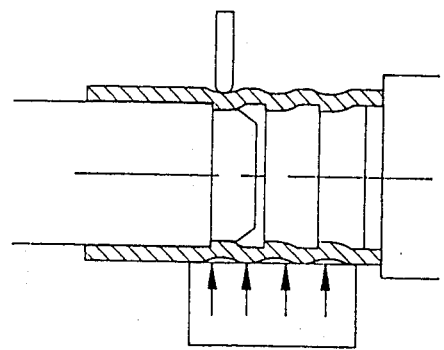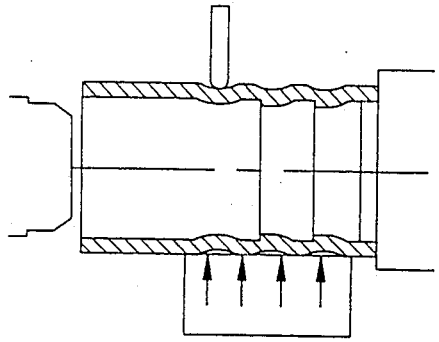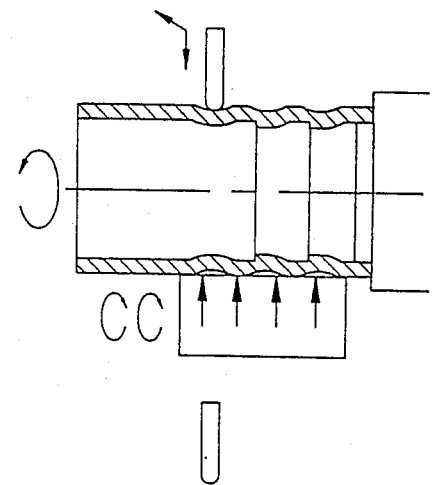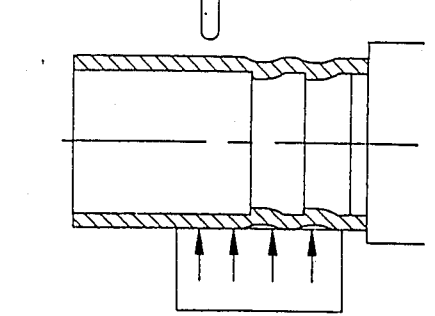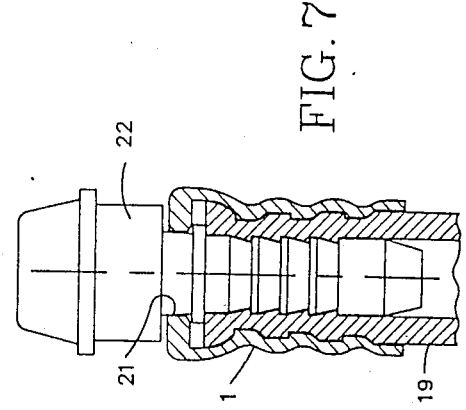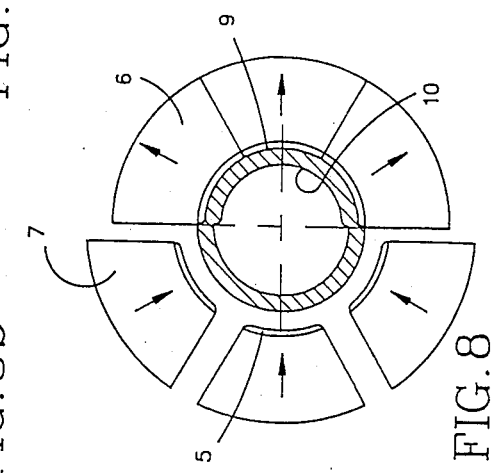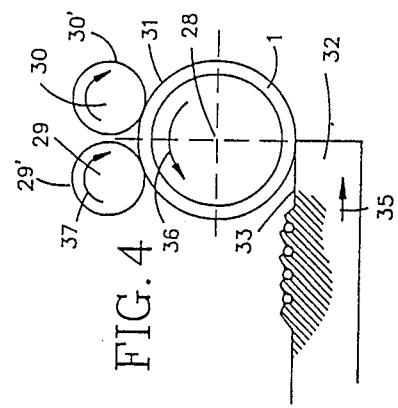

METHOD AND APPARATUS FOR MAKING A PRESSURE HOSE SOCKET

BACKGROUND OF THE INVENTION

The present invention relates to a process for the production of a pressure hose socket, a device for the production of such pressure hose sockets, and the hose pressure socket itself.

Such hose pressure sockets are needed for the production of hose connections in the high-pressure field. In such applications, a hose nipple, forming a hose coupling, is thrust into the end of the hose and presses the pressure hose socket onto the outside of the end of the hose. This enables a tooth formed in the socket to engage the end of the hose.

For hoses used in the low-pressure field, it suffices to make the hose pressure sockets from form-pressed sheet metal. Corrugations on the inner wall of the socket, stamped into the socket from outside, are sufficient for tooth engagement with the end of the hose. For high-pressure use, however, hose pressure sockets are turned from solid material. The production of the crowns of teeth, which usually run continuously around the inside of the socket is relatively expensive, because a lathe tool must make a plurality of cuts. Forming pointed teeth, especially for the production of a continuous ring of teeth, is practically impossible, since this requires not only radial but also axial movement of the lathe tool. Previously, cold forming of thick-walled metal sockets has not succeeded, because cutting from solid material, requires about three times as much raw material in relation to the final weight of the socket.

SUMMARY OF THE INVENTION

The present invention is, therefore, directed to the problem, especially for the high-pressure field, of providing a pressure hose socket of the thin-walled pipe sections (hereinafter called "sockets") and producing these sockets by cold forming. This problem is solved by the method and apparatus of the present invention.

Pipe sockets with a wall thickness from about 1.5 mm, are considered thin-walled. The minimum wall thickness increases with increasing socket diameter. Such sockets are suitable for all purposes of use in which a socket with inner teeth is rolled or pressed onto another object. Such sockets are equally suitable for teeth with obtuse, and acute angles at the tips of the teeth. A crown of such teeth, running around the inner wall of the socket may be either a continuous ring, or individual teeth arranged on a circumference. Preferably, the sockets are cylindrical, but they may have any other desired cross section.

The production process according to the invention makes it possible to produce pressure hose sockets by cold forming with common tools, and with those of hi-grade steel, without loss of material and extremely economically. Preferably, in the production of pressure hose sockets according to the invention, a pressing tool presses the continuous or interrupted corrugation and a stamp then forms, by means of a forming shoulder, under axial advance, the tooth or teeth. Finally, the pressing tool releases the socket and the pressing tool is moved into the neighboring work position, to produce, in the same sequence as described before, another crown of teeth on the same socket. The number of crowns necessary for a socket depends on the conditions to which the socket will be exposed. The end portion of the stamp has preferably a diameter smaller than the original inner diameter of the socket, and thus limits the flow of material in the pressing of the corrugation. The pressing tool, in turn, is an outer opposite support in the forming of the teeth by the forming shoulder. With this, the material forming, from the corrugation pressing, a crown of at least one inner elevation is formed on the stamp side into the desired contour. For this purpose, the stamp has, in connection with its said thinner end, a forming shoulder, which preferably has a relief corresponding to the desired tooth shape. The side of the tooth turned away from the stamp retains, therefore, essentially the form given by the corrugation press. In corrugations which do not run continuously around the socket, therefore, even single teeth lying on a circumference can be produced. The stamp has, in connection to the greatest diameter of the forming contour, an unchanged cross section, to assure the best possible support to the forming shoulder.

The corrugation pressing tool may, according to a further development of the invention, also consist of a pressing beam with a corrugation pressing edge and at least two support rolls, as well as the stamp. The corrugation pressing edge, under axial advance, presses corrugations continuously around the socket.

After the forming of the first crown of teeth, the stamp may be retracted by a predetermined amount, and followed by another pressing and forming step, so that practically any desired number of axially distanced crowns of teeth result. Preferably, several pressure hose sockets are produced simultaneously in a single machine. This is done by having the several sockets in tools arranged side-by-side. Teeth are produced simultaneously in each socket in another axial position and the sockets then moved up to the neighboring tool for production of the next crown of teeth. A number of corrugation pressing tools, corresponding to the number of crowns, are needed, while the stamps, assembled together in a common yoke, can be actuated by a single main stamp.

According to the state of the art, the sockets are given, at the end toward which the teeth point, a ring shoulder. The ring shoulder is directed inward at right angles from the socket wall, in order to mesh with corresponding grooves in the hose nipple, during the pressing process at the end of the hose. This work step requires an exact positioning of the hose nipple and the hose socket. If the tooth connection does not engage exactly, the hose, because of a defective hose connection, cannot be used. This disadvantage is eliminated, according to the invention. In a pressure hose socket produced according to the invention, an end of the socket is then pressed against a ring shoulder, directed inward, which is preferably inclined inward toward the inner space of the socket up to an angle of about 25°.

This pressing, unlike the usual turning of such a ring shoulder, has the effect that the inner material of the socket flows more strongly inward than the outer. The inside cross section formed by the ring shoulder tapers from the free end inward. The ring shoulder forms a cutting edge directed inward, which, in pressing onto the end of the hose, even with not wholly exact positioning of the hose nipple, reaches with greater security the ring groove of the hose nipple, and thus forms a guide for the material flowing after. Through the inward inclination of the shoulder, the material is prevented from moving axially outward in pressing against the hose nipple. In this way, not only is the ring shoulder very simple to produce, but also the subsequent mounting of the hose pressure socket is more secure, and scrap because of inexact positioning of those nipple and hose pressure socket is considerably reduced.

A cross section of the bearing surface of the pressing tool corresponds to the desired outer cross section of the pressure hose socket. The bearing surface prevents, in the forming of the teeth by the stamp, an outward flow of the material, so that the desired thickness of material can be maintained with only slight tolerance deviations. The support rolls, which may be used as an alternative, have a corresponding function.

The contour of the forming shoulder has an acute angular cut-back, so that the teeth of the hose pressure socket have a flat flank with an acute angle in the zone of the least inner cross section of the socket. Pressure hose sockets prepared in this way are especially suitable for hoses with wire reinforcement, in which the outer rubberizing is removed about down to the wire reinforcement before pushing on the hose pressure socket, so that the teeth engage in the wire reinforcement after the pressing process. But it is also possible, by certain forming of the teeth, to carry out a pressing without removal of the outer rubberizing.

For hoses with fabric reinforcement, on the other hand, there is recommended a contour of the forming shoulder with a relief forming a round cross section. In this way, the tips of the teeth are rounded off and a tearing of the fabric is prevented, but, through the relief, an advantageous meshing with the fabric is still given.

A second stamp movable axially, with a forming inner contour for the production of the inner-directed ring shoulder at one end of the socket, permits a rapid and simple forming. The relatively great wall thickness of the socket is taken into account by sufficiently great bending radii. An axial concentric projection, possibly in the center of the inner contour, prevents the socket material from flowing too far inward in the forming of the ring shoulder.

It is also possible to press a ring into a socket end, which will have the form of a support disc, and may be made of copper, for example, which is preferably soldered to the socket end after pressing in. It has been found that the resistance to tearing out of this ring corresponds to that of a ring shoulder turned from solid material.

Another alternative has proved especially advantageous, however, according to which the end of the socket away from the end of the hose is given a conical tapering. For example, a cylindrical socket end portion, of which the inner diameter corresponds to the outer diameter of the hose nipple, can be pushed or pressed, one over the other, and then soldered together at their radial circumferential contact surfaces. In this way, the turning of a ring groove is eliminated in the hose nipple or equivalent measures to produce a ring groove, so that, in all, a considerable amount of work is saved, and smooth, relatively thin-walled pipes can be used for the production of hose nipples.

Preferably, according to the invention, hose pressure sockets have several, preferably three, axially distanced closed rings of teeth, running around, pointing, at an acute angle to a socket end provided with a ring shoulder directed inward.

The above-mentioned parts to be used according to the invention are not subject, in their size, shape, choice of material and technical concept, to any special exceptional conditions, so that the criteria of choice known in the particular field of use may be applied without limitation.

BRIEF DESCRIPTION OF THE DRAWINGS

Other details, features and advantages of the subject of the invention are given from the description which follows, to the respective drawings, in which are represented the several production steps of one preferred form of execution of a pressure hose socket according to the invention. In the drawings:

FIGS. 3a-3d are similar to FIGS. 2a-2d illustrating the production of a third circumferential crown of teeth;

FIG. 4 is a schematic top view of the device in FIG. 1a-1d;

FIG. 7 is a cross sectional view illustrating a pressure hose socket with hose and hose nipple, in axial section;

FIG. 8 is a top view, partly in section, of another device for corrugation pressing with socket in two different work positions, in diagram;

FIG. 10 is similar to FIG. 3d illustrating a ring pressed in.

DESCRIPTION OF A PREFERRED EMBODIMENT

Figure 1A:
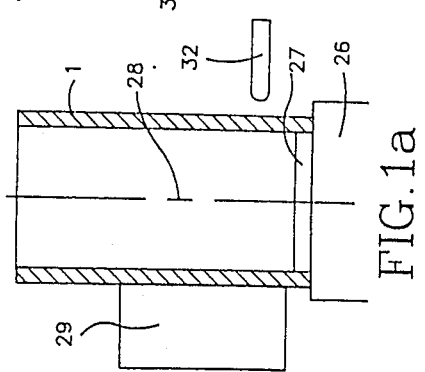
FIGS. 1a-1d are a schematic illustration of a device for the production of a pressure hose socket in four successive work steps, in side section with an axially cut socket.

According to FIGS. 1a to 3d, a pressure hose socket 1 can be produced from a pipe section. For example, the pipe section can be a cylindrical socket of steel, such as AISI-1010, with a wall thickness of about 2 mm and a diameter of about 35 mm, for a hose fitting intended for use up to 4300 psi. The pipe section of the hose pressure socket is set on a work table 26, with an elevation 27 to receive the socket 1. Parallel to the longitudinal axis 28 of the socket 1 extend two cylindrical support rolls 29, 30 (FIG. 4) which are rotatably supported about their axis. The surfaces 29', 30' engage the socket surface 31. At right angles to the socket axis 28 extends an elongated pressure beam 32, which is movable lengthwise along the periphery of the socket. The pressure beam 32 can be pressed radially against the socket surface 31, and has, at the socket side, a corrugation pressing edge 33. The corrugation pressing edge 33, as shown in detail, enlarged in FIG. 4, is roughened or provided with fine teeth.

The pressure beam 32, the support rolls 29 and 30, and the socket can be moved in common through friction connection. The pressure beam 32 advances in the arrow direction. The teeth of the corrugation pressing edge 33 cause a rotation of the socket around its axis 28 in the arrow direction. The socket 1 is supported, on its outer surface lying opposite the corrugation pressing edge 33, against the support rolls 29, 30, which are thus rotated in the arrow direction. Through the radial pressure exerted on the socket by the corrugation pressing edge 33, there results in the socket a corrugation, an elevation of material 10, extending inside tho socket. Through the moving of the pressure beam 32 in its lengthwise direction, there results, therefore, a circumferential and continuous corrugation 9, rolled into the socket 1.

Figure 1B:
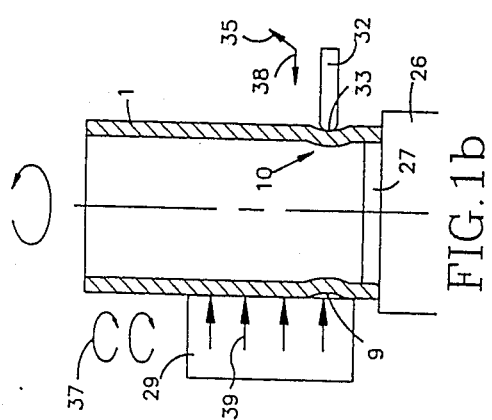
Figure 1C:
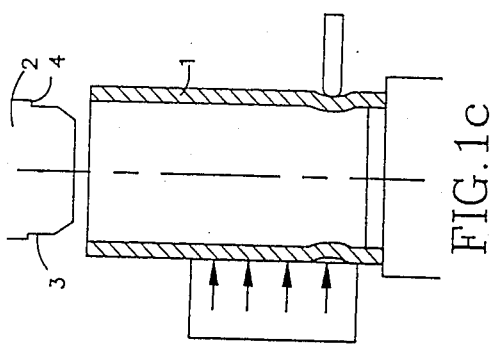
Figure 2A:
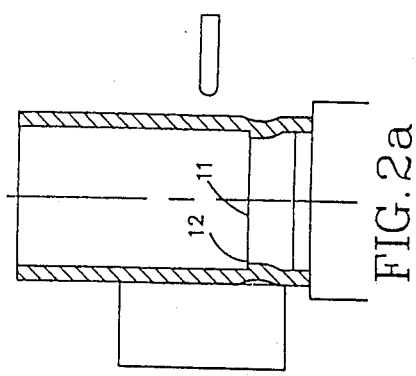
FIGS. 2a-2d are similar to FIGS. 1a-1d illustrating the production of a second circumferential crown of teeth.
Figure 2B:
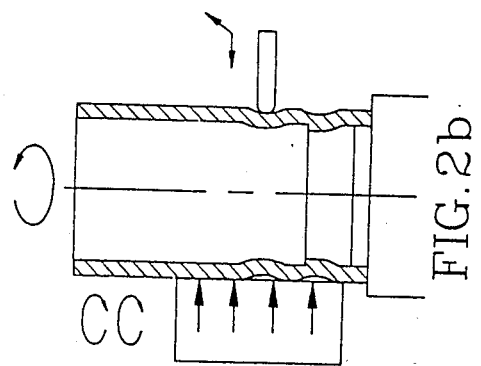

The progress of the corrugation rolling is shown from FIGS. 1b, 2b and 3b, in which the directing arrows 35 and 37 correspond to those in FIG. 4. It can also be seen from FIGS. 1b, 2b and 3b that the forces exerted radially on the socket 1 (arrows 38 and 39) by the support rolls 29, 30 and by the pressure beam 32, are about equal.

The axial length of the support rolls 29 and 30 is at least as great as that needed for the corrugation pressing of all the axially distanced corrugations 9 to be provided on one socket, so that for the production of each additional corrugation, the pressure beam 32 need only be pushed into a new work position (see FIGS. 1a, 2a and 3a).

Figure 2C:
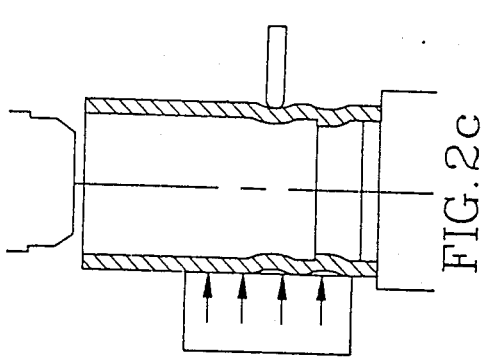

In the moving of the pressure beam 32 in its lengthwise direction, the socket 1 is rotated on its axis at least once completely, but preferably several times. After the conclusion of this rolling-in process of the corrugation 9, the support rolls 29 and 30, as well as the pressure beam 32 remain radially under load (FIGS. 1b, 2c and 3c). Now a first stamp 2 is moved into the inner space of the socket. The end portion 3 of the stamp 2 is tapered; its diameter corresponds to the least socket inner diameter provided, before pushing the socket onto a hose. The end portion 3 of the stamp 2 is connected to a forming shoulder 4, of which the outer diameter corresponds approximately to the inner diameter of the socket and of which the contour corresponds to that of the teeth to be formed. This contour has a relief, which is sharp-edged or rounded, according to the desired shape of teeth.

Figure 1D:
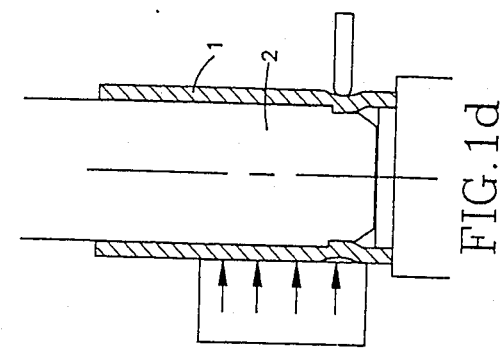
Figure 2D:
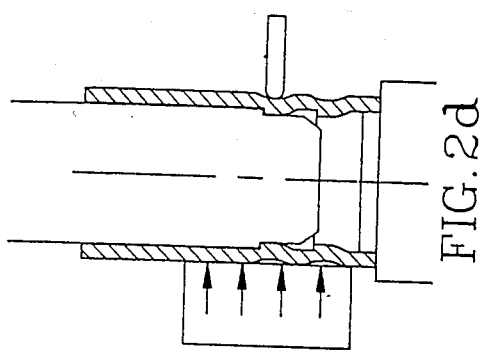

According to FIGS. 1d, 2d and 3d, the stamp 2 is run down into the socket 1 until it has formed the material elevation 10, on the stamp side, to a circumferential tooth ring 11, in the form of a circumferential tooth 12 (FIG. 2a). The process is repeated, as shown in FIGS. 2a to 3d, until the desired number of tooth rings produced.

According to FIG. 8, the corrugations 9 may also be produced by means of a pressing tool, in six parts, for example. The segments 6, 7 of the pressing tool grip the socket 1 in ring form and have, on the socket side, a forming contour 5. As represented by arrows, the segments for the corrugation pressing, move radially inward (FIG. 8, left half of figure) and then move radially outward again (FIG. 8, right half of figure). In the axial direction, at the side of the contour 5, on the segments 6, 7 are provided bearing surfaces (not shown in the drawing) for the flat gripping of the socket 1, against which the socket 1 is supported radially. The contour 5 may also be interrupted several times, so that only a series of individual depressions result in the socket 1.

All the segments are moved against the socket 1 simultaneously and thus press the corrugations 9 running around the socket. Then all the segments 6, 7 remain in the position shown at the right in FIG. 9, while the stamp 2 (as in FIGS. 1c/d, 2c/d and 3c/d) is moved downward by a predetermined distance, and forms the inner elevations of material 10, caused by the corrugations from above, according to the contour of its shoulder 4, to teeth.

Figure 5A:
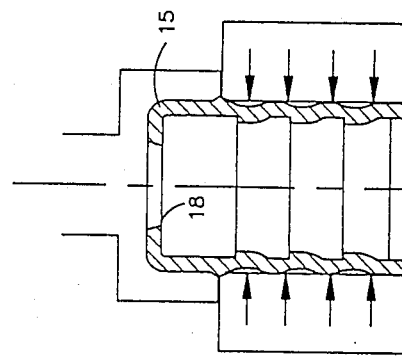
FIGS. 5a-5c are similar to FIG. 3d illustrating a device for the production of a ring shoulder in three work steps.
Figure 5B:
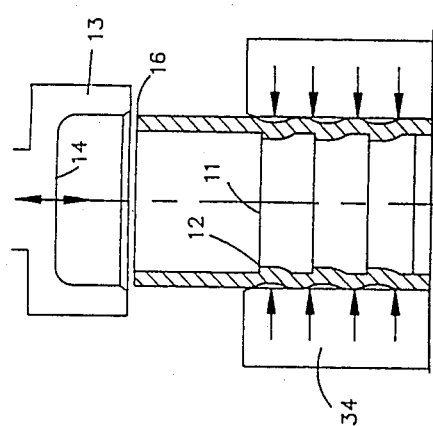
Figure 5C:
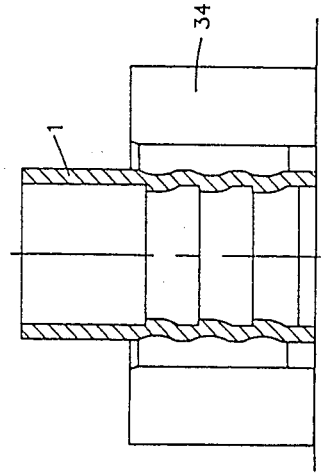

According to FIGS. 5a to 5c, a ring shoulder 15, directed inward, is formed by the fact that, in a stamping press, the socket 1 is first clamped radially by means of a clamping tool 34. Then a second stamp 13, with a forming contour 14 for the ring shoulder 15 directed inward, is moved down to the end of the socket 16, to which the teeth 12 point. A concentric projection (not shown in the drawing) in the contour 14 can prevent the projecting points 18, which are necessarily given at the end of the shoulder 15 within the socket, from pushing too far inward. This effect can also be prevented as shown in FIG. 5c, according to which the stamp 13 in its axial end position, lies with its end against the clamping tool 34.

Figure 6A:
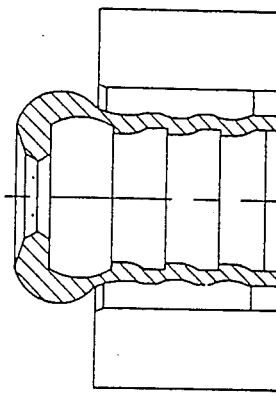
FIGS. 6a-6c are similar to FIG. 5c illustrating a device for the further forming of the ring shoulder in three work steps.
Figure 6B:
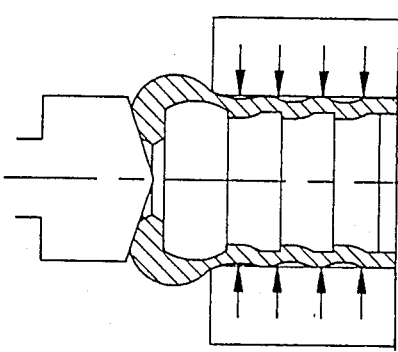
Figure 6C:
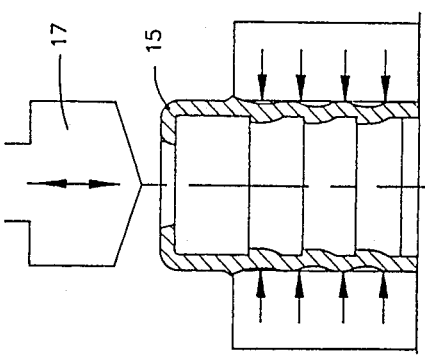

Then, in the same or a similar stamping press according to FIGS. 6a to 6c, a third stamp 17 can be moved against the ring shoulder 15, so that the latter is inclined inward by a certain angle, according to the end forming contour of the stamp 17, by which axial movements of the shoulder 15 are suppressed in pressing onto a hose later.

From FIG. 7 is shown the shape of the hose pressure socket 1, produced in a device according to FIGS. 1 to 6, or 8, after mounting on a steel wire reinforced rubber hose 19, of which the free end is pushed onto a hose nipple 22. The final mounting of such a hose fitting takes place, for example, by pushing the pressure hose socket 1 according to FIG. 6c onto the free end of the hose 22, and pushing in the nipple 22 up to a stop in the hose 19. Through radial pressing, which is known, of the hose pressure socket 1, its outer circumference is reduced, while the teeth 12 bite into the material of the hose 19, and the ring shoulder 15 is pressed into a groove 21 of the hose nipple 22.

Figure 9C:
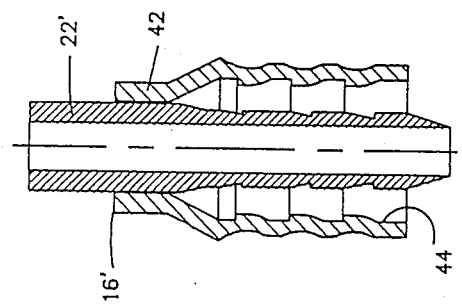
FIGS. 9a-9c are similar to FIG. 3d illustrating a device for the production of a cylindrical socket portion with reduced inner diameter.
Figure 9B:
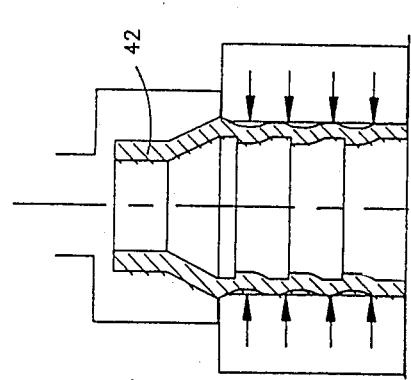
Figure 9A:
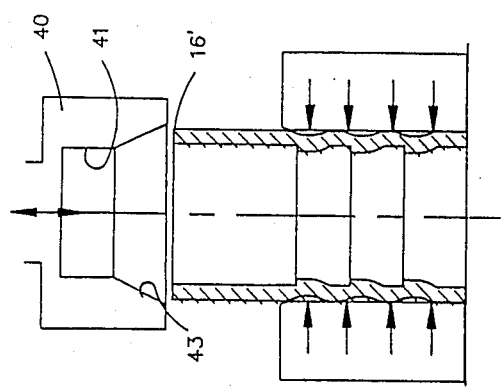

According to FIGS. 9a to 9c, for the production of a hose pressure socket, having at one socket end 16' a cylindrical socket zone 42 with reduced inner diameter, an axially movable stamp 40 can be used, which has an inner contour 41, with a conical transition zone 43, corresponding to a desired reduced outer diameter of the socket. Into the hose pressure socket formed in this way (according to FIG. 9b), a hose nipple 22', of smooth pipe, can be pushed or pressed, and preferably soldered at the radial contact surfaces. To facilitate pushing in, for the hose to be pressed onto the hose nipple, the socket zone 44, lying opposite the socket end 16', is preferably widened conically, while the hose nipple in this zone should be tapered conically, as usual.

Figure 10:
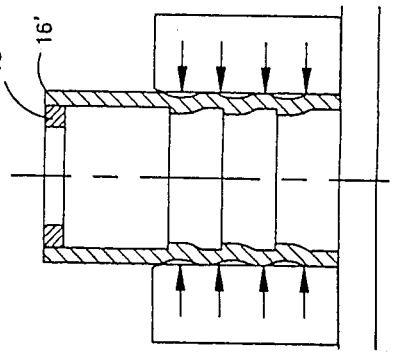

As an alternative to the ring shoulder according to FIGS. 5c to 8, a ring 45 (FIG. 10) may be pressed into the corresponding socket end 16'', and preferably soldered.

Having described a preferred embodiment, I claim:

1. A process for the production of a pressure hose socket having at least one crown with at least one tooth projecting inward and which points to one end of the socket, said process comprising the steps of pressing a socket from the outside into at least one continuous or interrupted corrugation projecting into the socket and forming at least one elevation of material, and stamping the at least one elevation of material from inside to form the tooth.

2. A process according to claim 1, wherein the step of pressing a socket from the outside includes a pressing tool pressing the corrugation, a stamp having a forming shoulder which axially advances to form the tooth, further including the step of the pressing tool releasing the socket, and the stamp and the pressing tool moving to a neighboring work position for the production of another crown and tooth on the same socket.

3. A process according to claim 2, wherein several sockets disposed in tools arranged side-by-side, are simultaneously provided with teeth, in another axial position, and then the sockets are moved up to the neighboring tool, in each case, for the production of the next crown and tooth.

4. A process according to claim 3 further including the step of pressing a socket end into a ring form shoulder directed inward.

5. A process according to claim 3 further including the step of pressing a ring into a socket end.

6. A process according to claim 3 further including the step of pressing a socket end against a cylindrical socket portion having reduced inner diameter.

7. A process according to claim 1 wherein said crown has a plurality of teeth projecting inward and said process comprises the steps of pressing a socket from outside into a plurality of continuous or interrupted corrugations projecting into the socket and forming a plurality of elevations of material, and stamping said plurality of elevations of material from inside to form said plurality of teeth.

8. A device for making a pressure hose socket, said device comprising:

a pressing tool with a plurality of radially movable segments having a forming contour which grip the socket transverse to the longitudinal axis of the socket in at least a portion of the outer surface of the socket to form a crown on an inner surface of the socket; and a first stamp movable axially into the socket having an end portion to engage said crown to form a tooth in said crown and having a shoulder with the contour of the part of the teeth pointing toward one end of the socket.

9. A device according to claim 8, wherein the side of said forming contour has bearing surfaces for the flat gripping of the socket.

10. A device according to claim 8 further including a second axially movable stamp with a forming inner contour for the production of an inward-directed ring shoulder on a socket end.

11. A device according to claim 10 further including a third axially movable stamp with a conically formed end surface for pressing the ring shoulder inward into the inner space of the socket.

12. A device according to claim 8 further including another axially movable stamp with a forming inner contour for the production of an cylindrical socket portion with reduced inner diameter at one end of the socket.

13. A device according to claim 8 wherein the shoulder of said first stamp has an undercut extending at an acute angle.

* * * * *